(12) United States Patent
Lim et al.

(10) Patent No.: US 9,413,496 B2
(45) Date of Patent: Aug. 9, 2016

(54) METHOD FOR TRANSCEIVING DATA IN WIRELESS COMMUNICATION SYSTEM, AND APPARATUS THEREFOR

(71) Applicant: LG ELECTRONICS INC., Seoul (KR)

(72) Inventors: Jaewon Lim, Anyang-si (KR); Kijun Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 1 day.

(21) Appl. No.: 14/395,768

(22) PCT Filed: Apr. 24, 2013

(86) PCT No.: PCT/KR2013/003510
§ 371 (c)(1),
(2) Date: Oct. 20, 2014

(87) PCT Pub. No.: WO2013/162281
PCT Pub. Date: Oct. 31, 2013

(65) Prior Publication Data
US 2015/0110027 A1  Apr. 23, 2015

Related U.S. Application Data

(60) Provisional application No. 61/638,483, filed on Apr. 25, 2012.

(51) Int. Cl.
*H04L 1/18* (2006.01)
(52) U.S. Cl.
CPC ............ *H04L 1/1861* (2013.01); *H04L 1/1812* (2013.01); *H04L 1/1822* (2013.01)
(58) Field of Classification Search
CPC .... H04L 1/1812; H04L 1/1822; H04L 1/1861

USPC .......................................... 370/310, 328, 329
See application file for complete search history.

(56) References Cited

U.S. PATENT DOCUMENTS

| | | | |
|---|---|---|---|
| 2007/0116002 A1 | 5/2007 | Nakamata | |
| 2010/0067459 A1* | 3/2010 | Goransson | ............... H04L 1/06 370/329 |
| 2010/0251054 A1 | 9/2010 | Cai et al. | |

(Continued)

FOREIGN PATENT DOCUMENTS

| | | |
|---|---|---|
| KR | 10-2008-0063424 A | 7/2008 |
| KR | 10-2010-0035088 A | 4/2010 |

(Continued)

*Primary Examiner* — Chi H Pham
*Assistant Examiner* — Robert Lopata
(74) *Attorney, Agent, or Firm* — Birch, Stewart, Kolasch & Birch, LLP

(57) ABSTRACT

According to one embodiment of the present invention, a method configured to enable user equipment to transmit or receive data relating to hybrid automatic repeat request (HARQ) process to/from a plurality of base stations in a wireless communication system may comprise the steps of: receiving, from a serving base station, information relating to HARQ processes allocated for the HARQ process of the plurality of base stations, and base station pattern information indicating the base station to/from which the user equipment transmits or receives the data in a specific subframe; and transmitting or receiving the data to/from at least one base station from among the plurality of base stations on the basis of the information relating to the HARQ processes and the base station pattern information.

14 Claims, 9 Drawing Sheets

(56) References Cited

U.S. PATENT DOCUMENTS

| | | | |
|---|---|---|---|
| 2011/0075611 A1* | 3/2011 | Choi | H04L 1/1819 370/329 |
| 2011/0176477 A1 | 7/2011 | Lee et al. | |
| 2011/0179329 A1 | 7/2011 | Kim et al. | |
| 2011/0223927 A1* | 9/2011 | Seo | H04B 7/2606 455/450 |
| 2011/0299452 A1* | 12/2011 | Seo | H04B 7/2606 370/315 |
| 2012/0014315 A1 | 1/2012 | Yang et al. | |
| 2012/0176884 A1* | 7/2012 | Zhang | H04B 7/024 370/203 |
| 2013/0051289 A1* | 2/2013 | Hsieh | H04L 1/1845 370/280 |
| 2013/0077543 A1* | 3/2013 | Kim | H04B 7/15507 370/281 |
| 2013/0084795 A1* | 4/2013 | Van Phan | H04B 7/15592 455/15 |
| 2013/0201841 A1* | 8/2013 | Zhang | H04L 1/1607 370/252 |
| 2014/0140273 A1* | 5/2014 | Kim | H04L 1/1812 370/328 |
| 2014/0269582 A1* | 9/2014 | Guan | H04W 72/1289 370/329 |
| 2014/0321406 A1* | 10/2014 | Marinier | H04B 7/024 370/329 |
| 2015/0003425 A1* | 1/2015 | Kim | H04W 72/042 370/336 |
| 2015/0023269 A1* | 1/2015 | Lee | H04L 1/1861 370/329 |

FOREIGN PATENT DOCUMENTS

| | | |
|---|---|---|
| KR | 10-2011-008469 A | 7/2011 |
| KR | 10-2011-0126177 A | 11/2011 |
| KR | 10-2012-0016072 A | 2/2012 |

* cited by examiner

METHOD FOR TRANSCEIVING DATA IN WIRELESS COMMUNICATION SYSTEM, AND APPARATUS THEREFOR

CROSS REFERENCE TO RELATED APPLICATIONS

This application is the National Phase of PCT International Application No. PCT/KR2013/003510, filed on Apr. 24, 2013, which claims priority under 35 U.S.C. 119(e) to U.S. Provisional Application No. 61/638,483, filed on Apr. 25, 2012, all of which are hereby expressly incorporated by reference into the present application.

TECHNICAL FIELD

The present invention relates to a method and apparatus for transmitting and receiving data in a wireless communication system.

BACKGROUND ART

Various techniques including Machine-to-Machine (M2M) communication and various devices including a smart phone requiring a high data rate, a tablet Personal Computer (PC), etc. have emerged and gained popularity. As a consequence, the amount of data to be processed in a cellular network is rapidly increasing. To satisfy the ever-increasing data processing requirement, Carrier Aggregation (CA), cognitive radio, etc. for efficiently using more frequency bands, and Multiple Input Multiple Output (MIMO), Coordinated Multipoint transmission and reception (CoMP), etc. for increasing the amount of data transmitted in limited frequencies have been developed. Also, communication environment is evolving toward an increased density of nodes accessible to User Equipments (UEs). A node refers to a fixed point with one or more antennas, which may transmit or receive wireless signals to or from a UE. A communication system with densely populated nodes may provide a high-performance communication service to UEs through cooperation between nodes.

In this multi-node cooperative communication scheme in which a plurality of nodes communicate with a UE using the same time-frequency resources, each node operates as an independent Base Station (BS) and thus offers a higher throughput than in a conventional communication scheme in which a node communicates with a UE without cooperation from other nodes.

A multi-node system performs cooperative communication using a plurality of nodes each operating as a BS, an Access Point (AP), an antenna, an antenna group, a Radio Remote Header (RRH), or a Radio Remote Unit (RRU). Compared to a conventional centralized antenna system in which antennas are concentrated in a BS, the plurality of nodes are generally apart from each other by a predetermined distance or larger in the multi-node system. The plurality of nodes may be managed by one or more BSs or one or more BS Controllers (BSCs) that control an operation of each node or schedule data to be transmitted or received through each node. Each node is connected to a BS or BSC that controls the node by cable or a dedicated line.

The above-described multi-node system may be regarded as a MIMO system in the sense that distributed nodes may communicate with one or more UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced transmission power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may be conducted with uniform quality irrespective of the locations of UEs within a cell. Further, the multi-node system boasts of reduced signal loss during transmission because a BS(s) or BSC(s) connected to a plurality of nodes cooperate in data transmission and reception. If nodes apart from each other by a predetermined distance or larger conduct cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

However, although the multi-node system is implemented based on the assumption of an ideal backbone network, the ideal backbone network is not built in an actual communication environment such as small cells. Accordingly, there is a need for developing a method for performing multi-node cooperative communication in the small-cell environment.

DISCLOSURE

Technical Problem

An object of the present invention devised to solve the conventional problem is to provide a method for transmitting and receiving data to and from a plurality of nodes, that is, a plurality of Base Stations (BSs) in the afore-described communication environment.

Another object of the present invention is to provide a method for transmitting and receiving data to perform a Hybrid Automatic Repeat and reQuest (HARQ) operation with a plurality of BSs.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting or receiving data related to a Hybrid Automatic Repeat reQuest (HARQ) procedure to or from a plurality of Base Stations (BSs) by a User Equipment (UE) in a wireless communication system includes receiving from a serving BS information about HARQ processes allocated for the HARQ procedure with the plurality of BSs and BS pattern information indicating BSs to or from which the UE is configured to transmit or receive the data in specific subframes, and transmitting or receiving the data to or from at least one of the plurality of BSs based on the information about the HARQ processes and the BS pattern information.

Additionally or alternatively, the information about the HARQ processes may include Identifiers (IDs) of the plurality of BSs and numbers of the HARQ processes allocated for the HARQ procedure with each of the plurality of BSs.

Additionally or alternatively, the information about the HARQ processes may be determined in consideration of a channel state and/or data load of each of the plurality of BSs.

Additionally or alternatively, the BS pattern information may include subframe indexes and an ID of a BS to or from which the UE is configured to transmit or receive the data in each of subframes indicated by the subframe indexes.

Additionally or alternatively, the BS pattern information may be repeated at a period of n subframes, and n may be an integer larger than 1.

In another aspect of the present invention, a method for transmitting or receiving data related to an HARQ procedure to or from a UE by a BS in a wireless communication system includes transmitting to the UE information about HARQ processes allocated for the HARQ procedure with a plurality of BSs including the BS and BS pattern information indicating BSs to or from which the UE is configured to transmit or receive the data in specific subframes, and transmitting or receiving the data to or from the UE based on the information about the HARQ processes and the BS pattern information.

Additionally or alternatively, The information about the HARQ processes may include IDs of the plurality of BSs and numbers of the HARQ processes allocated for the HARQ procedure with each of the plurality of BSs.

Additionally or alternatively, The information about the HARQ processes may be determined in consideration of a channel state and/or data load of each of the plurality of BSs.

Additionally or alternatively, The BS pattern information may include subframe indexes and an ID of a BS to or from which the UE is configured to transmit or receive data in each of subframes indicated by the subframe indexes.

Additionally or alternatively, The BS pattern information may be repeated at a period of n subframes, and n may be an integer larger than 1.

In another aspect of the present invention, a UE for transmitting or receiving data related to an HARQ procedure to or from a plurality of BSs in a wireless communication system includes a Radio Frequency (RF) unit, and a processor configured to control the RF unit. The processor is configured to receive from a serving BS information about HARQ processes allocated for the HARQ procedure with the plurality of BSs and BS pattern information indicating BSs to or from which the UE is configured to transmit or receive the data in specific subframes, and to transmit or receive the data to or from at least one of the plurality of BSs based on the information about the HARQ processes and the BS pattern information.

In another aspect of the present invention, a BS for transmitting or receiving data related to an HARQ procedure to or from a UE in a wireless communication system includes an RF unit and a processor configured to control the RF unit. The process is configured to transmit to the UE information about HARQ processes allocated for the HARQ procedure with a plurality of BSs including the BS and BS pattern information indicating BSs to or from which the UE is configured to transmit or receive the data in specific subframes, and to transmit or receive the data to or from the UE based on the information about the HARQ processes and the BS pattern information.

The technical solutions are merely a part of the embodiments of the present invention and those skilled in the art will understand that various embodiments reflecting the technical features of the present invention can be derived from a detailed description of the present invention as given below.

Advantageous Effects

According to an embodiment of the present invention, as a User Equipment (UE) communicates with a plurality of Transmission Points (TPs) by determining a specific TP for communication in a specific Hybrid Automatic Repeat and reQuest (HARQ) process, the specific TP is responsible for the specific HARQ process. Therefore, dependency and signaling overhead of communication between TPs can be reduced.

According to an embodiment of the present invention, since a UE communicates with a plurality of TPs in different HARQ processes, the UE can optimize a Modulation and Coding Scheme (MCS) level and transmission power for transmission to each TP. The resulting efficient transmission increases a maximum throughput.

Embodiments of the present invention are applicable to various Heterogeneous Network (HetNet) situations in which macro evolved Node Bs (eNode Bs or eNBs) and home eNBs are co-located or home eNBs are co-located.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Figure 1:
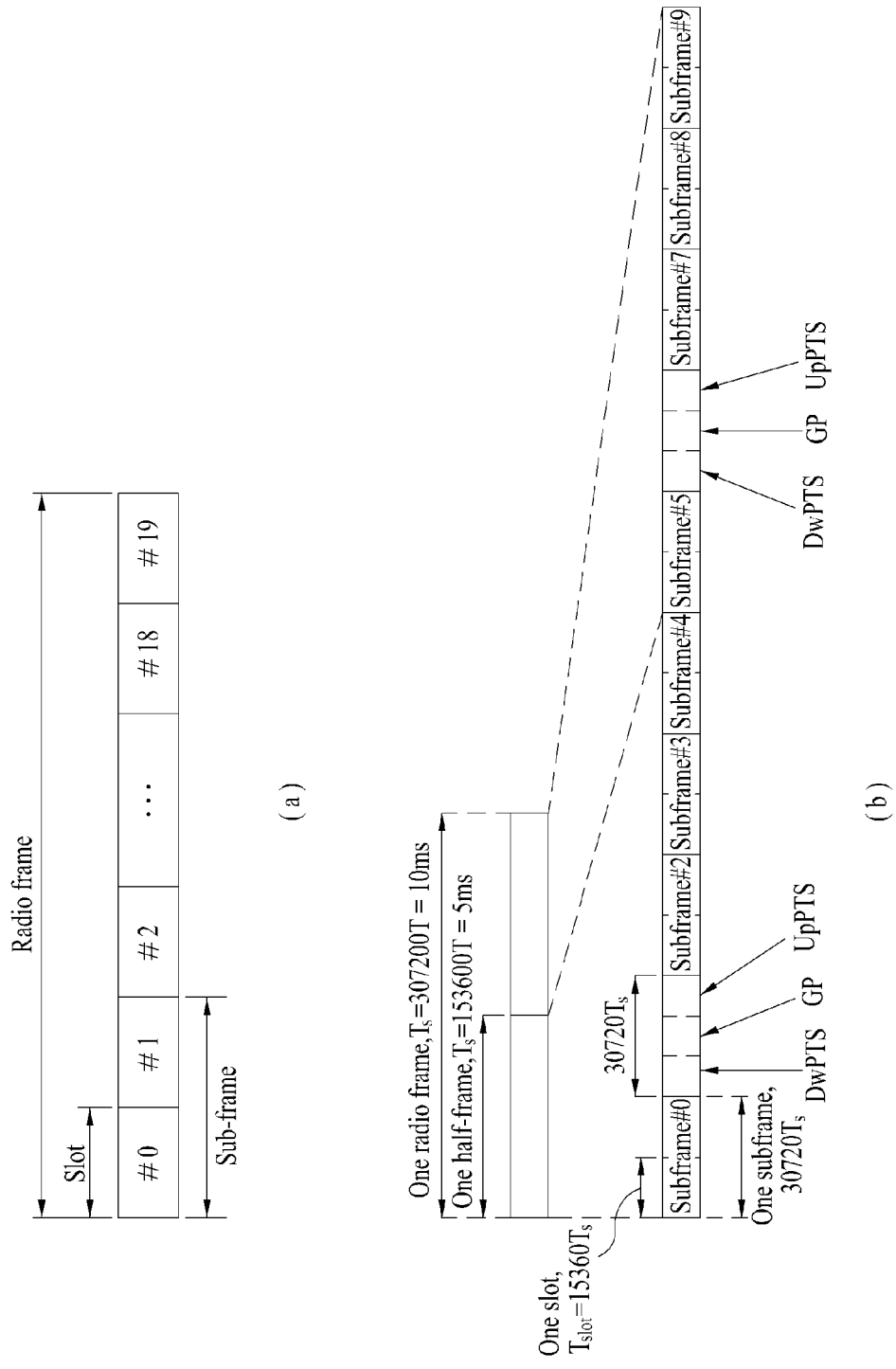
FIG. 1 illustrates an exemplary radio frame structure in a wireless communication system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Techniques, devices, and systems as described below are applicable to various wireless multiple access systems. For the convenience of description, the following description is given of the present invention in the context of a $3^{rd}$ Generation Partnership Project (3GPP) Long Term Evolution (LTE)/LTE-Advanced (LTE-A) system, which should not be construed as limiting the present invention. For example, although the following description is given in the context of the 3GPP LTE/LTE-A system as an exemplary mobile communication system, the same thing applies to other mobile communication systems except for features inherent to the 3GPP LTE/LTE-A system.

In some instances, known structures and devices are omitted or are shown in block diagram form, focusing on important features of the structures and devices, so as not to obscure the concept of the invention. Like reference numerals denote the same components throughout the specification.

In the present invention, User Equipments (UEs) may be fixed or mobile, including various devices that transmit and receive user data and/or various types of information to and from a Base Station (BS) by communication. The term UE may be replaced with terminal equipment, Mobile Station (MS), Mobile Terminal (MT), User Terminal (UT), Subscriber Station (SS), wireless device, Personal Digital Assistant (PDA), wireless modem, handheld device, etc. A BS generally refers to a fixed station communicating with a UE and/or another BS and exchanges data and control information with a UE and another BS. The term BS may be replaced with Advanced BS (ABS), Node B (NB), evolved Node B (eNB or eNode B), Base Transceiver System (BTS), Access Point (AP), Processing Server (PS), etc.

In the present invention, a Physical Downlink Control Channel (PDCCH)/Physical Control Format Indicator Channel (PCFICH)/Physical Hybrid automatic repeat and request Indicator Channel (PHICH)/Physical Downlink Shared Channel (PDSCH) is a set of time-frequency resources or Resource Elements (REs) that deliver Downlink Control Information (DCI)/Control. Format Indicator (CFI)/Downlink ACKnowledgment/Negative ACKnowledgment (DL ACK/NACK)/DL data. A Physical Uplink Control Channel (PUCCH)/Physical Uplink Shared Channel (PUSCH) is a set of time-frequency resources or REs that deliver Uplink Control Information (UCI)/Uplink (UL) data. Particularly, time-frequency resources or REs allocated to or belonging to the PDCCH/PCFICH/PHICH/PDSCH/PUCCH/PUSCH are referred to as PDCCH/PCFICH/PHICH/PDSCH/PUCCH/PUSCH resources or REs in the present invention. Thus, when it is said that a UE transmits a PUCCH/PUSCH, this means that the UE transmits UCI/UL data/random access signal on the PUCCH/PUSCH. Also, when it is said that a BS transmits a PDCCH/PCFICH/PHICH/PDSCH, this means that the BS transmits DL data/control information on the PDCCH/PCFICH/PHICH/PDSCH.

In the present invention, Cell-specific Reference Signal (CRS)/Demodulation Reference Signal (DMRS)/Channel State Information Reference Signal (CSI-RS) time-frequency resources (or REs) are time-frequency resources (or REs) that may be allocated to or are available to a CRS/DMRS/CSI-RS or time-frequency resources (or REs) carrying a CRS/DMRS/CSI-RS. A subcarrier including a CRS/DMRS/CSI-RS is referred to as a CRS/DMRS/CSI-RS subcarrier and an Orthogonal Frequency Division Multiplexing (OFDM) symbol carrying a CRS/DMRS/CSI-RS is referred to as a CRS/DMRS/CSI-RS symbol. Also, Sounding Reference Signal (SRS) time-frequency resources (or REs) are time-frequency resources (REs) carrying an SRS for a BS to use in measuring the state of a UL channel established between a UE and the BS. An RS is a predefined signal having a special waveform, known to both a BS and a UE. An RS is also called a pilot signal.

In the present invention, a cell is defined as a predetermined geographical area in which a BS, a node(s), or an antenna port(s) provides a communication service. Therefore, communication with a specific cell amounts to communication with a BS, a node, or an antenna port that provides a communication service to the specific cell. A DL/UL signal in a specific cell means a DL/UL signal from/to a BS, a node, or an antenna port that provides a communication service to the specific cell. A channel state/quality of a specific cell refers to a channel state/quality of a channel or a communication link established between a UE and a BS, a node, or an antenna port that provides a communication service to the specific cell.

FIG. 1 illustrates an exemplary structure of a radio frame in a wireless communication system. Specifically, FIG. 1(a) illustrates an exemplary radio frame structure for Frequency Division Duplex (FDD) mode in a 3GPP LTE/LTE-A system and FIG. 1(b) illustrates an exemplary radio frame structure for Time Division Duplex (TDD) mode in the 3GPP LTE/LTE-A system.

Referring to FIG. 1, a radio frame is 10 ms (307,200 $T_s$) in duration in the 3GPP LTE/LTE-A system. The radio frame is divided into 10 equal-sized subframes which may be numbered, respectively. $T_s$ represents a sampling time and is given as $T_s=1/(2048\times15$ kHz$)$. Each subframe is 1 ms long and further divided into two slots. The 20 slots of a radio frame may be numbered sequentially from 0 to 19. Each slot is 0.5 ms long/A unit time in which data is transmitted is defined as Transmission Time Interval (TTI). Time resources may be identified by a radio frame number (or a radio frame index), a subframe number (or a subframe index), a slot number (or a slot index), etc.

A different radio frame may be configured according to a duplex mode. For example, since DL transmission and UL transmission are distinguished from each other by frequency, a radio frame includes only DL subframes or UL subframes in a specific frequency band that operates in a specific carrier frequency in the FDD mode. In contrast, DL transmission and UL transmission are distinguished from each other by time in the TDD mode. Accordingly, a TDD radio frame includes both DL and UL subframes in a specific frequency band that operates in a specific carrier frequency.

[Table 1] lists DL-UL configurations for subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 1], D represents DL subframe, U represents UL subframe, and S represent special subframe. A special subframe includes three fields, Downlink Pilot Time Slot (DwPTS), Guard Period (GP), and Uplink Pilot Time Slot (UpPTS). The DwPTS is a time interval reserved for DL transmission and the UpPTS is a time interval reserved for UL transmission.

Figure 2:
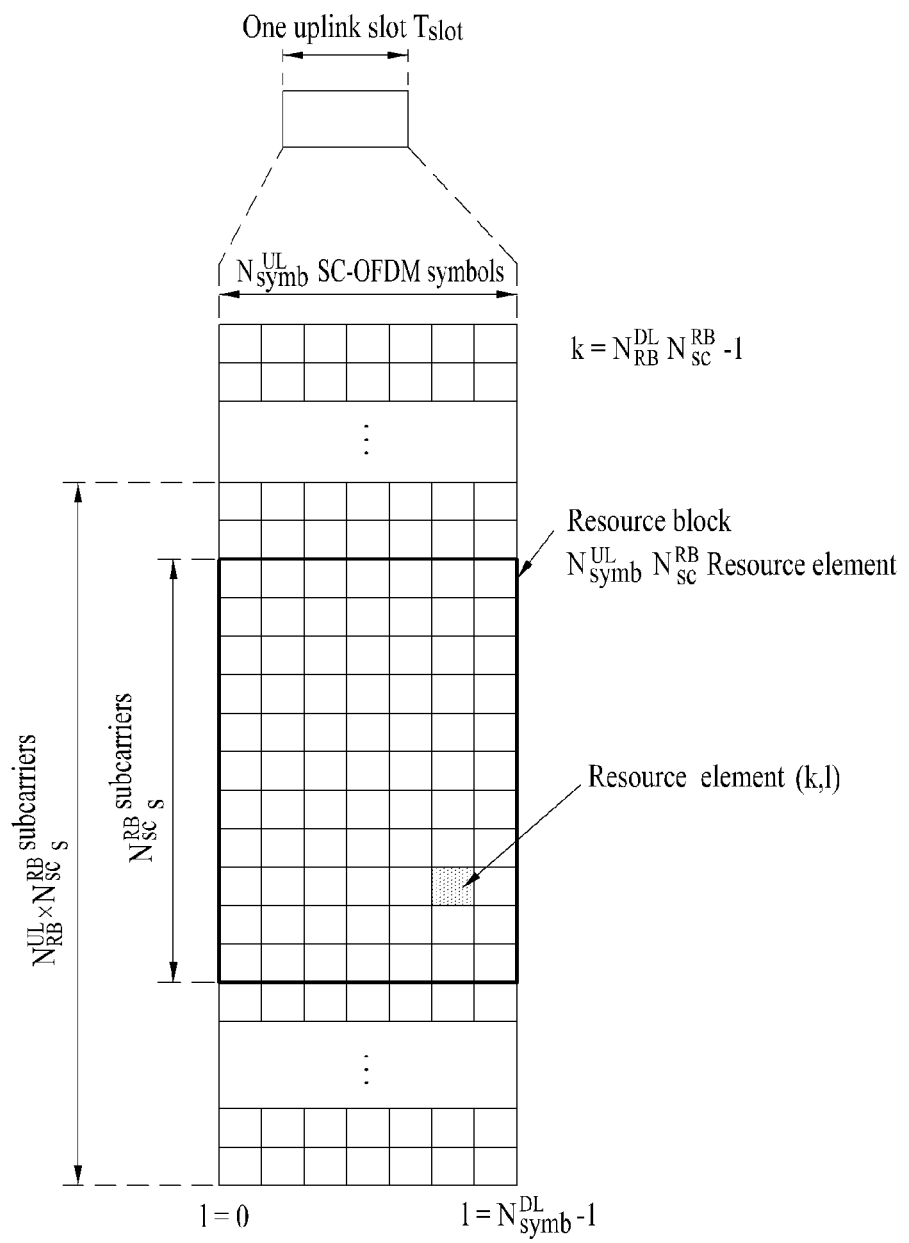
FIG. 2 illustrates an exemplary structure of a Downlink/Uplink (DL/UL) slot in a wireless communication system.

FIG. 2 illustrates an exemplary structure of a DL/UL slot in a wireless communication system. Specifically, FIG. 2 illustrates the structure of a resource grid in the 3GPP LTE/LTE-A system. There is one resource grid per antenna port.

A slot includes a plurality of OFDM symbols in the time domain by a plurality of Resource Blocks (RBs) in the frequency domain. An OFDM symbol means one symbol period. Referring to FIG. 2, a signal transmitted in each slot may be represented as a resource grid including $N^{DL/UL}_{symb}$ OFDM symbols by $N^{DL/UL}_{RB} \times N^{RB}_{SC}$ subcarriers. $N^{DL}_{RB}$ represents the number of RBs in a DL slot and $N^{UL}_{RB}$ represents the number of RBs in a UL slot. $N^{DL}_{RB}$ and $N^{UL}_{RB}$ depend on a DL transmission bandwidth and a UL transmission bandwidth, respectively. $N^{DL}_{symb}$ represents the number of OFDM symbols in the DL slot and $N^{UL}_{symb}$ represents the number of OFDM symbols in the UL slot. $N^{RB}_{SC}$ represents the number of subcarriers in one RB.

An OFDM symbol may be referred to as an OFDM symbol, an SC-FDMA symbol, etc. according to multiple access schemes. The number of OFDM symbols included in one slot may vary depending on a channel bandwidth and a Cyclic Prefix (CP) length. For example, one slot includes 7 OFDM symbols in the case of normal CP, whereas one slot includes 6 OFDM symbols in the case of extended CP. While one subframe is shown in FIG. 2 as including 7 OFDM symbols in each slot for the convenience of description, the embodiments of the present invention are applicable to a subframe including a different number of OFDM symbols. Referring to FIG. 2, each OFDM symbol includes $N^{DL/UL}_{RB} \times N^{RB}_{SC}$ subcarriers in the frequency domain. Subcarriers may be categorized into data subcarrier for data transmission, RS subcarrier for RS transmission, and null subcarrier for a guard band and a Direct Current (DC) component. The null subcarrier for the DC component is an unused subcarrier mapped to a carrier frequency f0 during OFDM signal generation or frequency upconversion. The carrier frequency is also called a center frequency.

An RB is defined as $N^{DL/UL}_{symb}$ (e.g., 7) consecutive OFDM symbols in the time domain by $N^{RB}_{SC}$ (e.g., 12) consecutive subcarriers in the frequency domain. For reference, a resource including one OFDM symbol by one subcarrier is called an RE or a tone. Therefore, one RB includes $N^{DL/UL}_{symb} \times N^{RB}_{SC}$ REs. Each RE of a resource grid may be uniquely identified by an index pair (k, l) in a slot. Herein, k represents an index ranging from 0 to $N^{DL/UL}_{RB} \times N^{RB}_{SC} - 1$ in the frequency domain and l represents an index ranging from 0 to $N^{DL/UL}_{symb} - 1$ in the time domain.

Two RBs, each located in one of the two slots of a subframe and occupying the same $N^{RB}_{SC}$ consecutive subcarriers in the subframe are called a Physical Resource Block (PRB) pair. The two RBs of a PRB pair have the same PRB number (or PRB index). A Virtual RB (VRB) is a logical resource allocation unit, which is introduced for resource allocation. A VRB is equal to a PRB in size. Two types of VRBs are defined, Localized VRB (LVRB) and Distributed VRB (DVRB) according to how VRBs are mapped to PRBs. LVRBs are mapped directly to PRBs and thus VRB numbers (or VRB indexes) are PRB numbers. That is, nPRB=nVRB. The LVRBs are numbered from 0 to NDLVRB−1 and NDLVRB=NDLRB. Therefore, according to the localized mapping, VRBs having the same VRB number are mapped to PRBs having the same PRB number in the first and second slots of a subframe. On the contrary, DVRBs are mapped to PRBs after interleaving. Accordingly, DVRBs having the same VRB number may be mapped to PRBs having different PRB numbers in the first and second slots of a subframe. Two PRBs having the same VRB number, each in one of the two slots of a subframe, is called a VRB pair.

Figure 3:
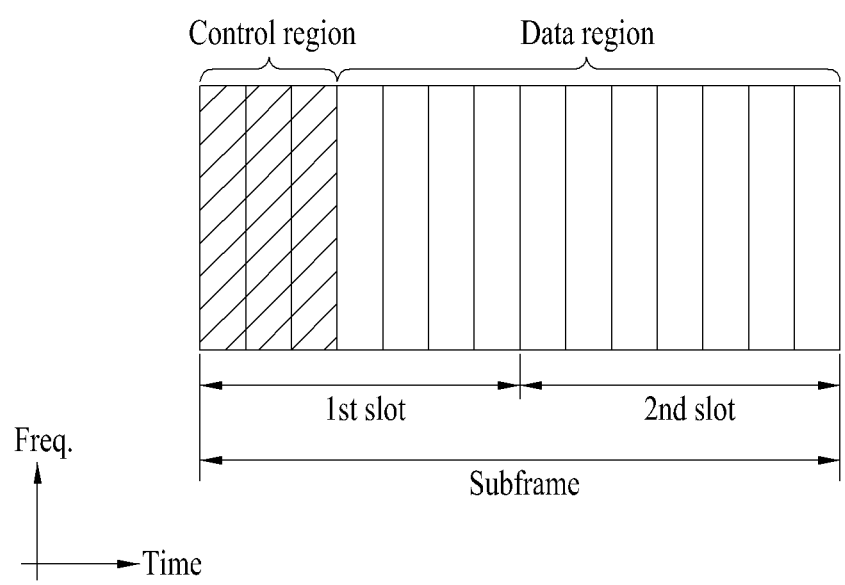
FIG. 3 illustrates an exemplary structure of a DL subframe in a $3^{rd}$ Generation Partnership project (3GPP) Long Term Evolution (LTE)/LTE-Advanced (LTE-A) system.

FIG. 3 illustrates the structure of a DL subframe in the 3GPP LTE/LTE-A system.

A DL subframe is divided into a control region and a data region in the time domain. Referring to FIG. 3, up to 3 (or 4) OFDM symbols at the start of the first slot of a DL subframe are used as a control region to which control channels are allocated. Hereinafter, a resource area available for PDCCH transmission in a DL subframe is referred to as a PDCCH region. The other OFDM symbols of the DL subframe except for the OFDM symbol(s) of the control region are used as a data region to which a PDSCH is allocated. Hereinafter, a resource area available for PDSCH transmission in a DL subframe is referred to as a PDSCH region. DL control channels defined for the 3GPP LTE system include PCFICH, PDCCH, PHICH, etc. The PCFICH is transmitted in the first OFDM symbol of a subframe, carrying information about the number of OFDM symbols used for transmission of control channels in the subframe. The PHICH delivers a Hybrid Automatic Repeat and reQuest (HARQ) ACK/NACK signal as a response to a UL transmission.

Control information delivered on the PDCCH is called DCI. The DCI transports resource allocation information and other control information for a UE or a UE group. For example, the DCI includes information about resource allocation and a transport format for a Downlink Shared Channel (DL-SCH), information about resource allocation and a transport format for an Uplink Shared Channel (UL-SCH), paging information on a Paging Channel (PCH), system information on the DL-SCH, information about resource allocation for a higher-layer control message such as a random access response transmitted on the PDSCH, a set of transmission power control commands for individual UEs of a UE group, a transmission power control command, Voice Over Internet Protocol (VoIP) activation indication information, etc. DCI delivered on a PDCCH has a different size and usage depending on its DCI format. The size of the DCI may vary with a coding rate.

A plurality of PDCCHs may be transmitted in the PDCCH region of a DL subframe. A UE may monitor a plurality of PDCCHs. A BS determines a DCI format according to DCI to be transmitted to a UE and adds a Cyclic Redundancy Check (CRC) to the DCI. The CRC is masked (or scrambled) by an Identifier (ID) (e.g., Radio Network Temporary Identifier (RNTI)) according to the owner or usage of a PDCCH. If the PDCCH is destined for a specific UE, the CRC may be masked by a Cell RNTI (C-RNTI) of the UE. If the PDCCH is for a paging message, the CRC of the PDCCH may be masked by a Paging RNTI (P-RNTI). If the PDCCH carries system information (particularly, a System Information Block (SIB)), its CRC may be masked by a System Information RNTI (SI-RNTI). If the PDCCH is for a random access response, the CRC of the PDCCH may be masked by a Random Access RNTI (RA-RNTI). CRC masking (or scrambling) includes, for example, XOR-operation of a CRC and an RNTI at a bit level.

A PDCCH is transmitted in an aggregate of one or more consecutive Control Channel Elements (CCEs). A CCE is a logical allocation unit used to provide a coding rate to the PDCCH based on a radio channel state. A CCE includes a plurality of Resource Element groups (REGs). For example, one CCE includes 9 REGs, each REG having 4 REs. 4 Quadrature Phase Shift Keying (QPSK) symbols are mapped to each REG. An RE occupied by an RS is excluded from an REG. Therefore, the number of REGs in a given OFDM symbol varies depending on the presence or absence of an RS. The concept of REG is also applied to other DL control channels (i.e. PCFICH and PHICH). A DCI format and the number of DCI bits are determined according to the number of CCEs.

CCEs are numbered and used consecutively. To simplify a decoding process, a PDCCH configured in a format including n CCEs may start only in a CCE having a number being a multiple of n. A BS determines the number of CCEs, that is, a CCE aggregation level used for transmission of a specific PDCCH according to a channel state. For example, one CCE may be sufficient for a PDCCH directed to a UE having a good DL channel (e.g., a UE near to the BS). However, 8 CCEs may be required for a PDCCH directed to a UE having a poor channel (e.g., a UE at a cell edge) in order to ensure robustness.

Figure 4:
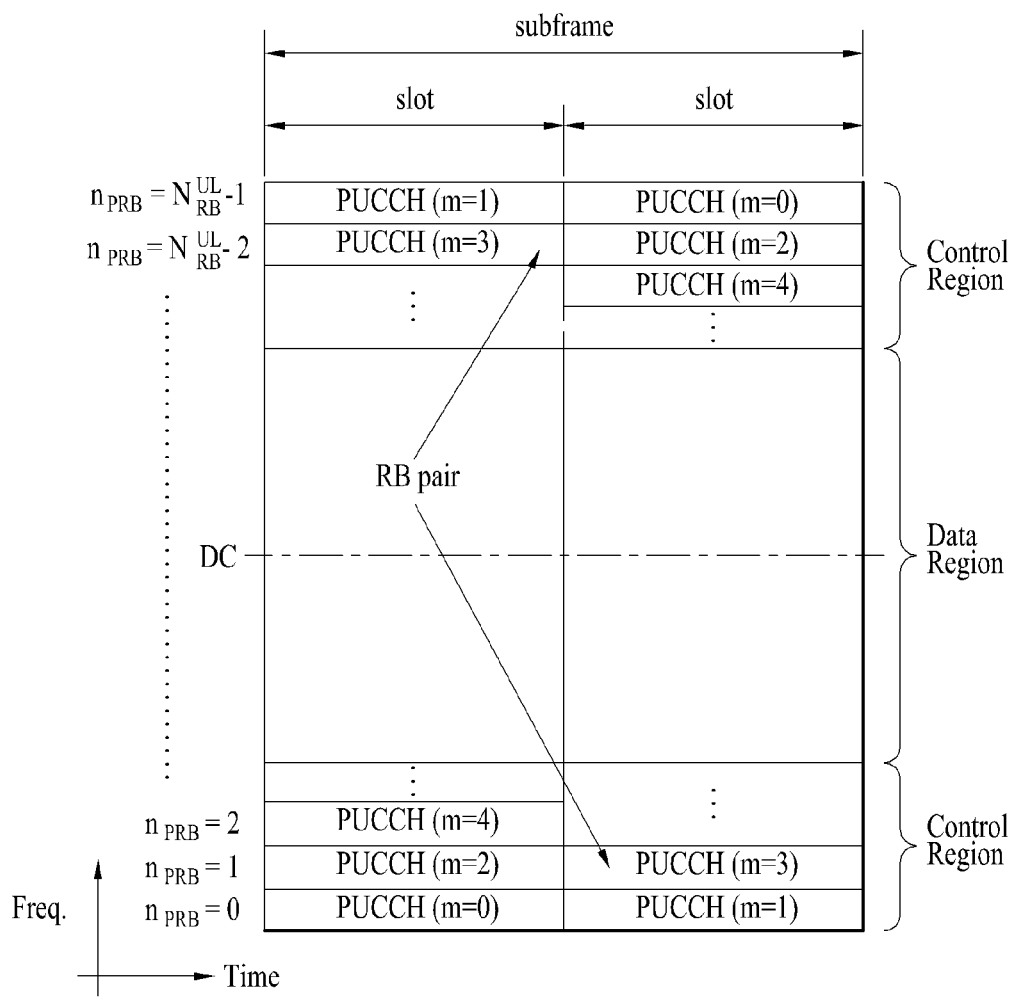
FIG. 4 illustrates an exemplary structure of a UL subframe in the 3GPP LTE/LTE-A system.

FIG. 4 illustrates an exemplary structure of a UL subframe in the 3GPP LTE/LTE-A system.

Referring to FIG. 4, a UL subframe may be divided into a control region and a data region in the frequency domain. One or more PUCCHs carrying UCI may be allocated to the control region and one or more PUSCHs carrying user data may be allocated to the data region. The control region and the data region of the UL subframe are referred to as a PUCCH region and a PUSCH region, respectively. An SRS may also be allocated to the data region. The SRS is transmitted in the last OFDM symbol of the UL subframe in the time domain and in a data transmission band, that is, the data region of the UL subframe in the frequency domain. SRSs that a plurality of UEs transmit in the last OFDM symbol of the same subframe may be distinguished from one another by frequency positions/sequences.

If a UE adopts SC-FDMA for UL transmission, the UE may not transmit a PUCCH and a PUSCH simultaneously on one carrier in a 3GPP LTE release 8 or release 9 system in order to maintain a single carrier property. In a 3GPP LTE release 10 system, a higher layer may indicate whether simultaneous transmission of a PUCCH and a PUSCH is supported.

In the UL subframe, subcarriers remote from a DC subcarrier are used as the control region. In other words, subcarriers at both ends of a UL transmission bandwidth are allocated for transmission of UCI. The DC subcarrier is a component unused for signal transmission and mapped to a carrier frequency f0 during frequency upconversion. A PUCCH for a UE is allocated to an RB pair belonging to resources operated in a carrier frequency in a subframe and the RBs of the RB pair occupy different subcarriers in the two slots of the subframe. It is said that an RB pair allocated to a PUCCH frequency-hops over a slot boundary. If frequency hopping is disabled, the RB pair occupies the same subcarriers.

The size and usage of UCI delivered on a PUCCH are different according to the format of the PUCCH. The size of the UCI may vary with a coding rate. For example, the following PUCCH formats may be defined.

TABLE 2

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/ RI + ACK/NACK | Normal CP only |
| 2b | QPSK + QPSK | 22 | CQI/PMI/ RI + ACK/NACK | Normal CP only |
| 3 | QPSK | 48 | ACK/NACK or SR + ACK/ NACK or CQI/PMI/ RI + ACK/NACK | |

Referring to [Table 2], a PUCCH format 1 series and a PUCCH format 3 series are mainly used to transmit ACK/NACK information, whereas a PUCCH format 2 series is mainly used to carry Channel State Information (CSI) such as a Channel Quality Indicator (CQI)/Precoding Matrix Index (PMI)/Rank Indicator (RI).

A BS allocates PUCCH resources for UCI transmission to a UE by a higher-layer signal, a dynamic control signal, or implicitly. Physical resources used for a PUCCH depend on two parameters indicated by a higher layer, $N_{RB}^{(2)}$ and $N_{CS}^{(1)}$. The parameter $N_{RB}^{(2)} \geq 0$ indicates an available bandwidth for PUCCH format 2/2a/2b transmission in each slot and is expressed as an integer multiple of $N_{sc}^{RB}$. The parameter $N_{cs}^{(1)}$ indicates the number of Cyclic Shifts (CSs) used for PUCCH format 1/1a/1b in an RB used for a mixture of format 1/1a/1b and format 2/2a/2b. A value of $N_{cs(1)}$ is an integer multiple of $\Delta_{shift}^{PUCCH}$ within a range of $\{0, 1, \ldots, 7\}$. $\Delta_{shift}^{PUCCH}$ is provided by a higher layer. If $N_{cs}^{(1)}$ is 0, no mixed RBs are present. No more than one RB supports a mixture of PUCCH format 1/1a/1b and PUCCH format 2/2a/

2b in each slot. Resources used for transmission of PUCCH format 1/1a/1b, PUCCH format 2/2a/2b, and PUCCH format 3 through antenna port p are expressed as $n_{PUCCH}^{(1,\tilde{p})}$, $$n_{PUCCH}^{(2,\tilde{p})} < N_{RB}^{(2)} N_{sc}^{RB} + \left\lceil \frac{N_{cs}^{(1)}}{8} \right\rceil \cdot (N_{sc}^{RB} - N_{cs}^{(1)} - 2),$$

and $n_{PUCCH}^{(3,\tilde{p})}$, respectively, which are indexes being non-negative integers.

More specifically, an orthogonal sequence and/or a CS to be applied to UCI is determined from a PUCCH resource index according to a predetermined rule for each PUCCH format and resource indexes of two RBs in a subframe, to which a PUCCH is to be mapped, are given. For example, a PRB for PUCCH transmission in slot $n_s$ is given as follows.

$$n_{PRB} = \begin{cases} \left\lfloor \frac{m}{2} \right\rfloor & \text{if } (m+n_s \bmod 2) \bmod 2 = 0 \\ N_{RB}^{UL} - 1 - \left\lfloor \frac{m}{2} \right\rfloor & \text{if } (m+n_s \bmod 2) \bmod 2 = 1 \end{cases} \quad \text{[Equation 1]}$$

In [Equation 1], a variable m depends on a PUCCH format and is given as [Equation 2], [Equation 3], and [Equation 4] for PUCCH format 1/1a/1b, PUCCH format 2/2a/2b, and PUCCH format 3, respectively.

$$m = \begin{cases} N_{RB}^{(2)} & \text{if } n_{PUCCH}^{(1,\tilde{p})} < \\ & c \cdot N_{cs}^{(1)} / \Delta_{shift}^{PUCCH} \\ \left\lfloor \frac{n_{PUCCH}^{(1,\tilde{p})} - c \cdot N_{cs}^{(1)} / \Delta_{shift}^{PUCCH}}{c \cdot N_{sc}^{RB} / \Delta_{shift}^{PUCCH}} \right\rfloor + N_{RB}^{(2)} + \left\lceil \frac{N_{cs}^{(1)}}{8} \right\rceil & \text{otherwise} \end{cases} \quad \text{[Equation 2]}$$

$$c = \begin{cases} 3 & \text{normal cyclic prefix} \\ 2 & \text{extended cyclic prefix} \end{cases}$$

In [Equation 2], $n_{PUCCH}^{(1,\tilde{p})}$ represents a PUCCH resource index of antenna port p for PUCCH format 1/1a/1b. In the case of an ACK/NACK PUCCH, $n_{PUCCH}^{(1,\tilde{p})}$ is a value implicitly determined by the first CCE index of a PDCCH carrying scheduling information for a corresponding PDSCH.

$$m = \lfloor n_{PUCCH}^{(2,\tilde{p})} / N_{sc}^{RB} \rfloor \quad \text{[Equation 3]}$$

In [Equation 3], $n_{PUCCH}^{(2,\tilde{p})}$ represents a PUCCH resource index of antenna port p for PUCCH format 2/2a/2b and is a value that a BS transmits to a UE by higher-layer signaling.

$$m = \lfloor n_{PUCCH}^{(3,\tilde{p})} / N_{SF,0}^{PUCCH} \rfloor \quad \text{[Equation 4]}$$

In [Equation 4], $n_{PUCCH}^{(3,\tilde{p})}$ represents a PUCCH resource index of antenna port p for PUCCH format 3 and is a value that a BS transmits to a UE by higher-layer signaling. $N_{SF,0}^{PUCCH}$ is a spreading factor for the first slot of a subframe. For both slots of a subframe using normal PUCCH format 3, $N_{SF,0}^{PUCCH}$ is 5. For the first and second slots of a subframe using reduced PUCCH format 3, $N_{SF,0}^{PUCCH}$ is 5 and 4, respectively.

Referring to [Equation 2], PUCCH resources for an ACK/NACK are not pre-allocated to each UE. Rather, a plurality of PUCCH resources are divided for a plurality of UEs within a cell at each time point. Specifically, PUCCH resources that a UE uses to transmit an ACK/NACK is determined dynamically based on a PDCCH carrying scheduling information for a PDSCH carrying corresponding DL data. A whole area of each DL subframe in which PDCCHs are transmitted includes a plurality of CCEs and a PDCCH transmitted to a UE includes one or more CCEs. The UE transmits an ACK/NACK in a PUCCH resource linked to a specific CCE (e.g., the first CCE) among the CCEs of a PDCCH that the UE has received. Hereinafter, a PUCCH resource which is linked to a PDCCH and determined dynamically will be referred to as an ACK/NACK PUCCH resource.

An ACK/NACK is feedback control information that a receiver transmits to a transmitter according to whether data transmitted by the transmitter has been decoded successfully at the receiver. For example, when a UE succeeds in decoding DL data, the UE may feed back ACK information to a BS and otherwise, the UE may feed back NACK information to the BS. Specifically, the receiver may need to transmit an ACK/NACK largely in the following three cases in the LTE system. First, the receiver transmits an ACK/NACK for a PDSCH transmission indicated by a detected PDCCH. Second, the receiver transmits an ACK/NACK for a PDCCH indicating Semi-Persistent Scheduling (SPS) release. Third, the receiver transmits an ACK/NACK for a PDSCH that has been transmitted without PDCCH detection. This means transmission of an ACK/NACK for SPS. Unless otherwise specified, the ACK/NACK transmission scheme is not limited to any specific one of the three cases.

Figure 5:
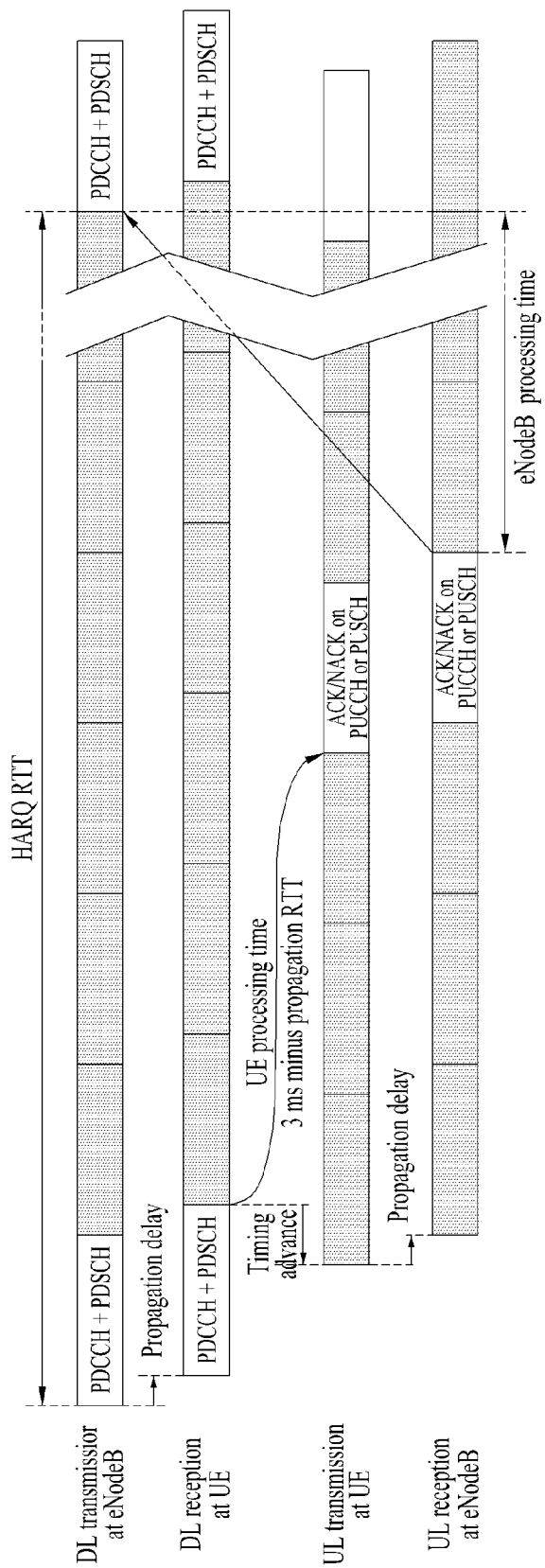
FIG. 5 illustrates a DL Hybrid Automatic Repeat and reQuest (HARQ) process in an LTE Frequency Division Duplex (FDD) system.
Figure 6:
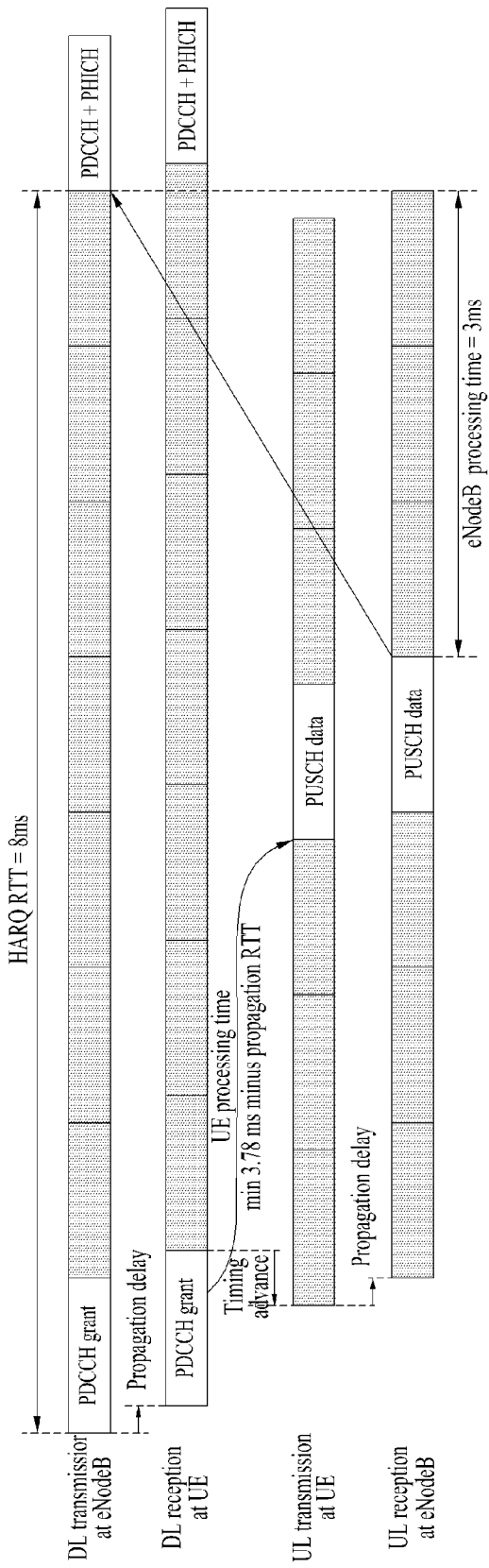
FIG. 6 illustrates a UL HARQ process in an LTE FDD system.

FIG. 5 illustrates a DL HARQ process in an LTE FDD system and FIG. 6 illustrates a UL HARQ process in the LTE FDD system.

The LTE FDD system supports 8 Stop-And-Wait (SAW) HARQ processes with a constant Round Trip Time (RTT) of 8 ms on both UL and DL.

Each HARQ process is identified by a 3-bit (4-bit in LTE TDD) unique HARQ process ID (or number), and a receiver (i.e., a UE in a DL HARQ process and an eNB in a UL HARQ process) needs to allocate individual soft buffers for combining retransmission data. It is also defined in the LTE system that for an HARQ operation, information such as a New Data Indicator (NDI), a Redundancy Version (RV), and a Modulation and Coding Scheme (MCS) level is signaled to the receiver.

The LTE system adopts adaptive asynchronous HARQ for a DL HARQ process. Accordingly, DCI for an HARQ process is explicitly signaled in every DL transmission. On the other hand, the LTE system adopts synchronous HARQ for a UL HARQ process, which may be performed either adaptively or non-adaptively. Since control information is not explicitly signaled, a predetermined RV sequence, for example, an RV sequence of 0, 2, 3, 1, 0, 2, 3, 1, ... is required for consecutive packet transmissions in a non-adaptive UL HARQ scheme. In contrast, RVs are explicitly signaled in an adaptive UL HARQ scheme.

At present, the 3GPP LTE is working on standardization of a technique of performing transmissions according to a predetermined time pattern in order to mitigate interference between adjacent Transmission Points (TPs) under the issue of Almost Blank Subframe (ABS). In the ABS scheme, an aggressor cell that may interfere with communication of neighbor cells preliminarily transmits an ABS pattern being its transmission pattern to the neighbor cells interfered by the aggressor cell, so-called victim cells. As the victim cells communicate with UEs connected to them actively using subframes configured as ABSs by the aggressor cell, they may reduce interference from the aggressor cell and increase the cell detection performance of UEs which are to access and communicate with the victim cells, with respect to the victim cells and the cell maintenance performance of UEs connected to the victim cells.

ABS will be described below in greater detail.

ABS-related signaling via an X2 interface used for communication between eNBs will be described in detail. To increase the utilization of ABS, an eNB configures restricted measurement for a UE and transmits two different ABS-based measurement sets to the UE. That is, upon receipt of an ABS pattern of a neighbor cell, particularly an aggressor cell through an X2 interface, the eNB configures measurement sets for a UE connected to the eNB based on the ABS pattern of the aggressor cell. In the legacy 3GPP LTE system, a UE should measure CRSs in all subframes in order to select an MCS, an RI, and a PMI. However, if a neighbor cell configures ABSs and thus does not transmit any DL signal or transmits a DL signal with reduced power in subframes configured as the ABSs, interference varies with an ABS pattern and thus the UE should perform a subframe-specific measurement. For the subframe-specific measurement, the eNB indicates measurement of a specific subframe to a specific UE and the UE performs the subframe-specific measurement. This is called restricted measurement. If a specific cell configures some of total subframes as ABSs to support restricted measurement, the cell should transmit information specifying the configured ABSs via an eNB-eNB X2 interface. The current 3GPP LTE-A standard largely defines ABS information and ABS status as ABS signaling.

ABS information is illustrated in [Table 3] below. ABS information Info indicates subframes to be used as ABSs in the form of a bitmap. ABS information Info is 40 bits in FDD mode, whereas although ABS information Info varies with UL-DL configurations, it is configured as a bitmap of up to 70 bits in TDD mode. In the FDD mode, for example, ABS information Info represents 40 subframes in 40 bits, each bit indicating ABS if its value is 1 and non-ABS if its value is 0. When restricted measurement is configured for a UE, the number of CRS antenna ports of a corresponding cell is indicated to the UE, for CRS measurement. Measurement Subset is a subset of ABS Pattern Info. As with ABS information Info, ABS Pattern Info is a bitmap of 40 bits in the FDD mode and up to 70 bits in the TDD mode, which is a kind of recommended restricted measurement set for use in configuring restricted measurement for a UE.

TABLE 3

| IE/Group Name | Presence | Range | IE type and reference | Semantics description |
|---|---|---|---|---|
| CHOICE ABS Information | M | — | — | |
| >FDD | | | — | — |
| >>ABS Pattern Info | M | | BIT STRING (SIZE(40)) | Each position in the bitmap represents a DL subframe, for which value "1" indicates 'ABS' and value "0" indicates 'non ABS'. The first position of the ABS pattern corresponds to subframe 0 in a radio frame where SFN = 0. The ABS pattern is continuously repeated in all radio frames. The maximum number of subframes is 40. |
| >>Number Of Cell-specific Antenna Ports | M | | ENUMERATED (1, 2, 4, . . . ) | P (number of antenna ports for cell-specific reference signals) |
| >>Measurement Subset | M | | BIT STRING (SIZE(40)) | Indicates a subset of the ABS Pattern Info above, and is used to configure specific measurements towards the UE. |
| >TDD | | | — | — |
| >>ABS Pattern Info | M | | BIT STRING (1 . . . 70, . . . ) | Each position in the bitmap represents a DL subframe for which value "1" indicates 'ABS' and value "0" indicates 'non ABS'. The maximum number of subframes depends on UL/DL subframe configuration. The maximum number of subframes is 20 for UL/DL subframe configuration 1~5; 60 for UL/DL subframe |

TABLE 3-continued

| IE/Group Name | Presence | Range | IE type and reference | Semantics description |
|---|---|---|---|---|
| | | | | configuration 6; 70 for UL/DL subframe configuration 0. UL/DL subframe configuration. The first position of the ABS pattern corresponds to subframe 0 in a radio frame where SFN = 0. The ABS pattern is continuously repeated in all radio frames, and restarted each time SFN = 0. |
| >>Number Of Cell-specific Antenna Ports | M | | ENUMERATED (1, 2, 4, . . . ) | P (number of antenna ports for cell-specific reference signals) |
| >>Measurement Subset | M | | BIT STRING (1 . . . 70, . . . ) | Indicates a subset of the ABS Pattern Info above, and is used to configure specific measurements towards the UE |
| >ABS Inactive | M | | NULL | Indicates that interference coordination by means of almost blank sub frames is not active |

[Table 4] below illustrates an ABS status IE. The ABS status IE is used to help an eNB to determine whether to change an ABS pattern. Usable ABS Pattern Info is a subset of ABS Pattern Info in the form of a bitmap, which indicates whether subframes configured as ABSs are used successfully for interference reduction or not. DL ABS status specifies a ratio between the number of DL RBs scheduled for subframes indicated by Usable ABS Pattern Info and the number of RBs allocated to UEs that should be protected through ABSs among the DL RBs, indicating how efficiently ABSs have served their purpose in a victim cell.

TABLE 4

| IE/Group Name | Presence | Range | IE type and reference | Semantics description |
|---|---|---|---|---|
| DL ABS status | M | | INTEGER (0 . . . 100) | Percentage of used ABS resources. The numerator of the percentage calculation consists of resource blocks within the ABS indicated in the Usable ABS Pattern Info IE allocated by the eNB$_2$ for UEs needing protection by ABS from inter-cell interference for DL scheduling, or allocated by the eNB$_2$ for other reasons (e.g. some control channels). The denominator of the percentage calculation is the total quantity of resource blocks within the ABS indicated in the Usable ABS Pattern Info IE. |
| CHOICE Usable ABS Information | M | | — | — |
| >FDD | | | — | — |
| >>Usable ABS Pattern Info | M | | BIT STRING (SIZE(40)) | Each position in the bitmap represents a subframe, for which value "1" indicates 'ABS that has been designated as protected from inter- |

TABLE 4-continued

| IE/Group Name | Presence | Range | IE type and reference | Semantics description |
|---|---|---|---|---|
| | | | | cell interference by the eNB$_1$, and available to serve this purpose for DL scheduling in the eNB$_2$,' and value "0" is used for all other subframes. The pattern represented by the bitmap is a subset of, or the same as, the corresponding ABS Pattern Info IE conveyed in the LOAD INFORMATION message from the eNB$_1$. |
| >TDD | | | — | — |
| >>Usable ABS Pattern Info | M | | BIT STRING (1 ... 70) | Each position in the bitmap represents a subframe, for which value "1" indicates 'ABS that has been designated as protected from inter-cell interference by the eNB$_1$, and available to serve this purpose for DL scheduling in the eNB$_2$,' and value "0" is used for all other subframes. The pattern represented by the bitmap is a subset of, or the same as, the corresponding ABS Pattern Info IE conveyed in the LOAD INFORMATION message from the eNB$_1$. |

In a situation where a plurality of TPs placed in an aggressor-victim relationship in terms of interference predetermine their transmission patterns specifying their transmission and reception timings by mutual scheduling, a UE at a geographical location where the UE may communicate with all corresponding cells may communicate with a specific TP at an available transmission/reception time of the specific TP. Therefore, the UE may communicate with the plurality of TPs by matching its transmission and reception time points to the transmission patterns of the TPs. Herein, the UE may communicate with each of the plurality of TPs that have preset their transmission/reception time points without overlap by establishing a connection with the TP.

The present invention provides a method for, when a UE is placed at a geographical location where it can sense signals from two or more TPs and communicate with the TPs, enabling the UE to allocate available HARQ processes to the respective TPs and communicate with each TP at a predetermined transmission point of the TP in an HARQ process allocated to the TP.

Figure 7:
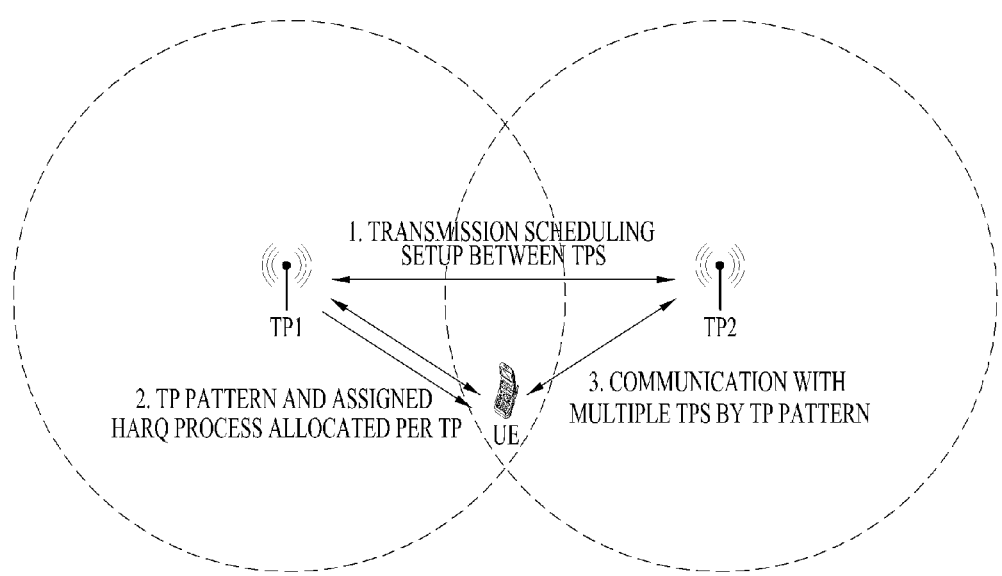
FIG. 7 illustrates a wireless communication environment according to an embodiment of the present invention.

FIG. 7 illustrates a communication method according to an embodiment of the present invention. In the illustrated case of FIG. 7, first and second TPs, TP1 and TP2 schedule their respective transmission patterns by defining their transmission and reception time points and communicate with a UE connected to the TPs, TP1 and TP2. Referring to FIG. 7, the UE is at a location where it can communicate with both the TPs, TP1 and TP2. The UE may receive TP pattern information configured for a plurality of TPs and information about HARQ processes available for communication with specific TPCs from the TP, TP1 with which the UE has established a connection and has been communicating via the connection. Then the UE may communicate alternately with the TPs, TP1 and TP2 based on the received information. The UE may perform an HARQ transmission/reception operation with a specific TP at a specific time point in a specific HARQ process. Herein, the UE receives DCI from the specific TP at each time point, for use in communicating with the specific TP. That is, the UE is configured to receive DL control information and data information from a DL point. The same thing applies to a UL.

That is, upon receipt of a command indicating connection to the TP TP2 from the current serving TP TP1, while maintaining the connection with the TP TP1, the UE may establish a connection with the TP, TP2 and communicate alternately with a plurality of TPs at transmission time points defined for the TPs according to the already received TP pattern information in HARQ processes allocated to the TPs. Herein, the UE may be configured to transmit ACK/NACK information for a specific DL HARQ process and retransmission data for a UL HARQ process to a TP with which the UE has communicated in the HARQ process earlier. This is because transmission to a TP from which the UE has received a signal in a previous HARQ process reduces overhead caused by unnecessary signaling between TPs, for combining of HARQ retransmission data.

The above-described scheme in which a UE connects to an available different TP(s) and communicates alternately with the TPs, while maintaining a connection with a current serving TP is defined as partial handover.

In an LTE/LTE-A FDD system, 8 HARQ processes may be allocated to each of DL and UL for each UE. To transmit and receive data to and from a UE in an HARQ process, a TP may indicate a DL/UL HARQ process used for transmission in an allocated RB area by transmitting an HARQ process number and information about the allocated RB area in DCI of a PDCCH. Each HARQ process may run by allocating a soft buffer to the HARQ process, for combining of retransmission data.

To allow a UE to conduct data communication with a plurality of TPs according to the present invention, an HARQ operation defined to support communication between a UE and only one TP by the current LTE/LTE-A standard needs modification. That is, the UE may be allowed to transmit and receive data to and from a specific TP at a specific transmission point in an available HARQ process by transmitting TP pattern information and information about an available HARQ process for each TP to the UE.

A TP communicating with the UE from among a plurality of TPs that can communicate with the UE, that is, a serving TP may transmit to the UE information indicating use of an indicated HARQ process at a specific transmission point for communication with a specific TP.

For this purpose, the serving TP may transmit to the UE TP-specific HARQ process information specifying HARQ processes allocated to specific TPs and TP pattern information indicating TPs which the UE is supposed to transmit or receive data to or from at specific transmission points.

The TP-specific HARQ process information may specify TPs for which 8 DL HARQ processes and 8 UL HARQ processes are available in data transmission or reception. The TP-specific HARQ process information may be configured, for example, as a table in which TP IDs are mapped to the numbers of available HARQ processes. The TP-specific HARQ processes may be configured by allocating a Service Data Flow (SDF) of a specific UE to each TP in consideration of the channel state and data load of the TP and thus allocating an HARQ process for use in each SDF.

The TP pattern information specifies TPs which the UE is supposed to transmit and receive data to and from at an interval of a TTI during a predetermined time period. Thus, the UE may periodically determine a TP for data transmission and reception, taking into account the TP pattern information. Both the TP-specific HARQ process information and the TP pattern information may be determined for each of UL and DL.

[Table 5] illustrates an example of the TP-specific HARQ process information that the serving TP transmits to the UE. The UE may use 5 HARQ processes, HARQ processes 0 to 4 to communicate with the TP, TP1 and 3 HARQ processes, HARQ processes 5, 6, and 7 to communicate with the TP, TP2.

TABLE 5

| TP | HARQ process |
|---|---|
| 1 | 0, 1, 2, 3, 4 |
| 2 | 5, 6, 7 |

[Table 6] illustrates an example of the TP pattern information that the serving TP transmits to the UE. That is, the TP pattern information indicates a TP to or from which data is to be transmitted or received in each TTI during a predetermined TP pattern period. In [Table 6], the column of 'Bit Number' indicates the sequence of bits in a bitmap of the TP pattern information. Each bit number indicates a TTI or a subframe (i.e. a subframe index) associated with a corresponding transmission in an ascending order. The column of "TP" identifies TPs to which data is to be transmitted, indexing the TPs with which the UE is to communicate. That is, the column of "TP" may list the IDs of the TPs to communicate with the UE. The TP pattern information should be determined in consideration of preset transmission scheduling information between TPs (or information about transmission patterns between TPs). The serving TP may determine the TP pattern information based on the transmission scheduling information between TPs.

TABLE 6

| Bit Number | TP |
|---|---|
| 0 | 1 |
| 1 | 1 |
| 2 | 2 |
| 3 | 1 |
| 4 | 1 |
| 5 | 2 |
| 6 | 1 |
| 7 | 1 |
| 8 | 2 |
| 9 | 1 |
| 10 | 1 |
| . | . |
| . | . |
| . | . |
| 36 | 2 |
| 37 | 1 |
| 38 | 1 |
| 39 | 2 |

In a UL HARQ operation, a retransmission packet is to be transmitted to the same TP at a period of an 8-ms RTT because the UL HARQ operation is synchronous. That is, a UE may transmit data in subframe n and receive ACK/NACK information in subframe (n+4) in response to the transmitted data. Upon receipt of a NACK from the TP, the UE should retransmit the data in subframe (n+8). The UE preferably retransmits the previous received data at a retransmission so that the TP may combine the corresponding data. Therefore, it is necessary to designate the same TP every 8 ms and indicate UL TP pattern information, for UL transmission. Also, DL TP pattern information needs to be configured in order to allow the UE to receive ACK/NACK information in the same $(n+4)^{th}$ TP for data transmitted in subframe n.

In the case of ABS as exemplary transmission scheduling between TPs, since ABSs are planned every 40 ms, a UL HARQ operation of a UE that should transmit data to the same TP every 8 ms may have a problem. Accordingly, if it is difficult to allocate the same TP every 8 ms, the UE may configure UL TP pattern information by allocating data not requiring retransmission to a subframe which cannot be allocated to the same TP every 8 ms. An example of the data not requiring retransmission is data scheduled by Semi-Persistent Scheduling (SPS).

In a DL HARQ operation, there is no need for reflecting an 8-ms HARQ RTT in a DL TP pattern because the DL HARQ operation is asynchronous. However, as a UE needs to transmit ACK/NACK information for data received in subframe n from an indicated TP to the same TP in subframe (n+4), a DL TP pattern and a UL TP pattern may be configured in such a manner that the same TP may be allocated for an $n^{th}$ reception of DL TP pattern information and an $(n+4)^{th}$ transmission of UL TP pattern information.

Figure 8:
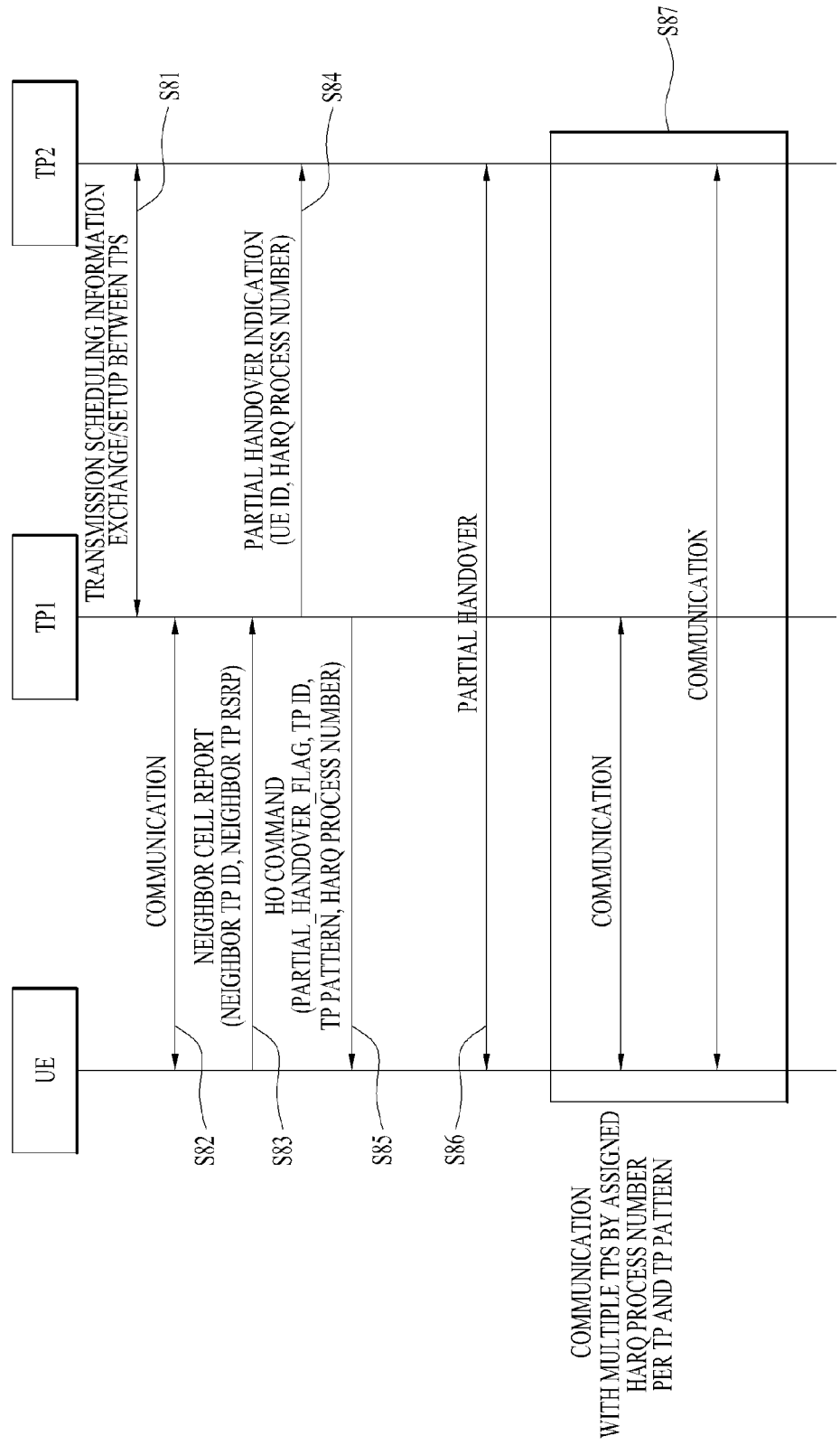
FIG. 8 is a diagram illustrating a signal flow for a data transmission and reception procedure according to an embodiment of the present invention.

FIG. 8 illustrates a data transmission and reception procedure according to an embodiment of the present invention. Referring to FIG. 8, first and second TPs, TP1 and TP2 may exchange and/or configure TP-TP transmission scheduling information (or TP-TP transmission pattern information)

indicating transmission timings with each other in order to reduce mutual interference (S81). A UE may communicate with the first TP, TP1 (S82).

The UE measures a signal received from the second TP, TP2 and notifies the first TP, TP1 that the second TP, TP2 is located within a communication area of the UE during communication with the first TP, TP1 (S83). For the measurement, the UE may measure Reference Signal Received Power (RSRP), Received Signal Strength Indication (RSSI), etc. If the UE needs to communicate with a plurality of TPs for balancing the traffic load of the UE or for any other reason, the first TP, TP1 may transmit a partial handover indication to the second TP, TP2 (S84). The handover indication may include an ID of the UE and an HARQ process number to be used for communication between the second TP, TP2 and the UE. The handover indication may indicate that the UE is supposed to communicate with both TPs, TP1 and TP2.

The first TP, TP1 may transmit to the UE a handover command including partial_handover_flag that is an indicator for connection between the UE and the plurality of TPs, IDs of the TPs, a TP pattern, and an HARQ process number (S85). For the TP pattern, refer to [Table 4]. In other words, the TP pattern may include information (e.g., a TP ID) about a TP that the UE will communicate with in each TTI or each subframe.

Upon receipt of the handover command, the UE connects to the second TP, TP2 by partial handover (S86) and communicates with an indicated TP at a specific transmission time point in an HARQ process allocated to the TP (S87).

The afore-defined or afore-described TP pattern information may be referred to as, for example, cell pattern information, RP pattern information, BS pattern information, AP pattern information, eNB pattern information. etc. Also, the TP-specific HARQ process information may be referred to as, for example, cell-specific HARQ process information, RP-specific HARQ process information, BS-specific HARQ process information, AP-specific HARQ process information, eNB-specific HARQ process information, etc.

Compared to Coordinated Multiple Point transmission and reception (CoMP) in which a UE is scheduled to communicate with a set of a plurality of TPs as if the UE communicates with a single TP, the afore-described embodiment(s) of the present invention have the following advantages.

First, unlike CoMP, a specific TP may be responsible for a specific HARQ process. Therefore, dependency and signaling overhead of communication between TPs can be reduced.

Second, since a UE communicates with a plurality of TPs in different HARQ processes, the UE may optimize an MCS level and transmission power for each TP. The resulting efficient transmission increases a maximum throughput.

Third, the embodiment(s) of the present invention are applicable to various Heterogeneous Network (HetNet) situations in which macro eNBs and home eNBs are co-located or home eNBs are co-located. In CoMP, eNBs of a CoMP set should communicate dynamically via eNB-eNB communication interfaces to perform a CoMP operation. However, the proposed method has less dependency on inter-cell interfaces for operation control, except for settings in an initial operation. Therefore, a situation in which no inter-cell interface exists as in the case of a macro eNB and a femto eNB or transmission via an inter-cell interface takes much time can be handled flexibly.

Figure 9:
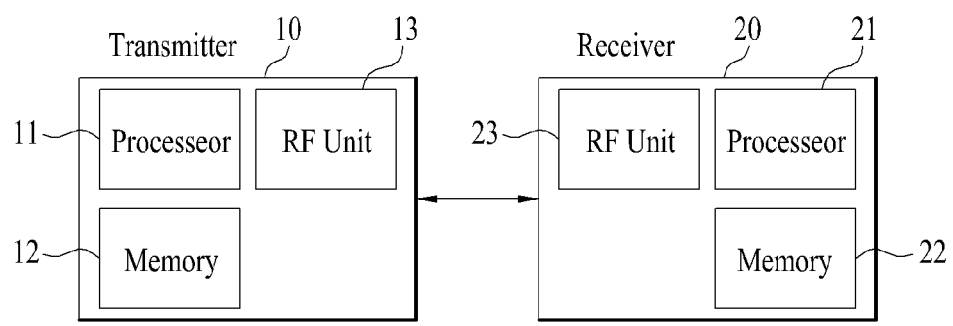
FIG. 9 is a block diagram of apparatuses for implementing an embodiment(s) of the present invention.

FIG. 9 is a block diagram of apparatuses configured to perform a UL transmission-related operation according to an embodiment of the present invention. A transmitter 10 and a receiver 20 include Radio Frequency (RF) units 13 and 23 for transmitting or receiving a wireless signal carrying information and/or data, a signal, a message, etc., memories 12 and 22 for storing various types of information related to communication in a wireless communication system, and processors 11 and 21 connected operatively to components such as the RF units 13 and 23 and the memories 12 and 22, for controlling the memories 12 and 22 and/or the RF units 13 and 23 to perform at least one of the afore-described embodiments of the present invention.

The memories 12 and 22 may temporarily store programs for processing and control of the processors 11 and 21 and input/output information. The memories 12 and 22 may be used as buffers.

The processors 11 and 21 generally provide overall control to various modules in the transmitter 10 and the receiver 20. Particularly, the processors 11 and 21 may perform various control functions to implement the present invention. The processors 11 and 21 may be called controllers, microcontrollers, microprocessors, microcomputers, etc. The processors 11 and 21 may be achieved by hardware, firmware, software, or a combination thereof. In a hardware configuration, the processors 11 and 21 may include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. that are configured to perform the present invention. In a firmware or software configuration, the firmware or the software may be configured to include a module, a procedure, a function, etc. that performs functions or operations of the present invention. The firmware or software configured to implement the present invention may be included in the processors 11 and 21 or may be stored in the memories 12 and 22 and executed by the processors 11 and 21.

The processor 11 of the transmitter 10 encodes and modulates a signal and/or data scheduled for transmission by the processor 11 or by a scheduler connected to the processor 11 in a predetermined coding and modulation scheme and transmits the coded and modulated signal and/or data to the RF unit 13. For example, the processor 11 converts a data stream to be transmitted to K layers by demultiplexing, channel coding, scrambling, modulation, etc. The coded data stream is called a codeword equivalent to a Transport Block (TB) which is a data block provided by a Medium Access Control (MAC) layer. A TB is encoded to a codeword and each codeword is transmitted in the form of one or more layers to a receiver. The RF unit 13 may include an oscillator, for frequency upconversion. The RF unit 13 may include $N_t$ transmission antennas ($N_t$ is a positive integer).

The receiver 20 processes a signal in reverse order of the signal processing of the transmitter 10 under the control of the processor 21. The RF unit 23 of the receiver 20 receives a wireless signal from the transmitter 10 under the control of the processor 21. The RF unit 23 may include Nr (a positive integer) reception antennas. The RF unit 23 recovers each signal received through the reception antennas to a baseband signal by frequency downconversion. The RF unit 23 may include an oscillator, for frequency downconversion. The processor 21 may recover the data transmitted by the transmitter 10 by decoding and demodulating wireless signals received through the reception antennas.

Each of the RF units 13 and 23 includes one or more antennas. The antennas transmit signals processed by the RF units 13 and 23 or receive external wireless signals and transmit the received wireless signals to the RF units 13 and 23, under the control of the processors 11 and 21. An antenna is also called an antenna port. Each antenna may correspond to one physical antenna or may include two or more physical antenna elements. The receiver 20 may not further decompose a signal transmitted by each antenna. An RS transmitted through an antenna defines the antenna from the viewpoint of the receiver 20. The RS enables the receiver 20 to perform channel estimation for the antenna irrespective of whether a channel is a single radio channel from one physical antenna or a composite channel from a plurality of physical antenna elements included in the antenna. That is, the antenna is defined so that a channel carrying a symbol from the antenna may be derived from a channel carrying another symbol from the same antenna. An RF unit supporting MIMO in which data is transmitted and received using multiple antennas may be connected to two or more antennas.

In the embodiments of the present invention, a UE or a relay operates as the transmitter 10 on UL and as the receiver 20 on DL. In the embodiments of the present invention, a BS operates as the receiver 20 on UL and as the transmitter 10 on DL. In the embodiments of the present invention, each of a UE and its peer UE operates as the transmitter 10 on UL for Device-to-Device (D2D) communication and as the receiver 20 on DL for D2D communication.

A specific structure of a UE or a BS functioning as the above receiver or transmitter may be realized so as to apply the various embodiments of the present invention described before with reference to the attached drawings independently or to apply two or more embodiments of the present invention at the same time.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention are applicable to a BS, a UE, or other devices in a wireless communication system.

What is claimed is:

1. A method for transmitting or receiving data related to a Hybrid Automatic Repeat reQuest (HARQ) procedure to or from a plurality of Base Stations (BSs) by a User Equipment (UE) in a wireless communication system, the method comprising:
receiving, from a serving BS, information about HARQ processes allocated for the plurality of BSs and information about a BS pattern indicating a specific BS, among the plurality of BSs, performing communication with the UE in specific subframes, wherein at least one HARQ process allocated for one of the plurality of BSs is different from at least one HARQ process allocated for another of the plurality of BSs; and
transmitting or receiving data to or from the specific BS in one of the specific subframes by using one of at least one HARQ process allocated for the specific BS.

2. The method according to claim 1, wherein the information about the HARQ processes includes Identifiers (IDs) of the plurality of BSs and numbers of the HARQ processes allocated for each of the plurality of BSs.

3. The method according to claim 1, wherein the information about the HARQ processes is determined in consideration of a channel state and/or data load of each of the plurality of BSs.

4. The method according to claim 1, wherein if the BS pattern indicates the specific BS in N-th subframe, the BS pattern indicates the specific BS in N+8-th subframe, and
wherein the UE transmits data to the specific BS in each of the N-th subframe and the N+8-th subframe.

5. The method according to claim 1, wherein if the BS pattern indicates the specific BS in N-th subframe, the BS pattern indicates the specific BS in N+4-th subframe, and
wherein the UE receives data from the specific BS in the N-th subframe and transmits acknowledgment or negative acknowledgment (ACK or NACK) information regarding the received data to the specific BS in the N+4-th subframe.

6. A method for transmitting or receiving data related to a Hybrid Automatic Repeat reQuest (HARQ) procedure to or from a User Equipment (UE) by a Base Station (BS) in a wireless communication system, the method comprising:
transmitting, to the UE, information about HARQ processes allocated for a plurality of BSs including the BS and information about a BS pattern indicating the BS performing communication with the UE in specific subframes, wherein at least one HARQ process allocated for one of the plurality of BSs is different from at least one HARQ process allocated for another of the plurality of BSs; and
transmitting or receiving data to or from the UE in one of the specific subframes by using one of at least one HARQ process allocated for the BS.

7. The method according to claim 6, wherein the information about the HARQ processes includes Identifiers (IDs) of the plurality of BSs and numbers of the HARQ processes allocated for each of the plurality of BSs.

8. The method according to claim 6, wherein the information about the HARQ processes is determined in consideration of a channel state and/or data load of each of the plurality of BSs.

9. The method according to claim 6, wherein if the BS pattern indicates the BS in N-th subframe, the BS pattern indicates the BS in N+8-th subframe, and
wherein the BS receives data from the UE in each of the N-th subframe and the N+8-th subframe.

10. The method according to claim 6, wherein if the BS pattern indicates the BS in N-th subframe, the BS pattern indicates the BS in N+4-th subframe, and
wherein the BS transmits data to the UE in the N-th subframe and receives acknowledgment or negative acknowledgment (ACK or NACK) information regarding the transmitted data from the UE in the N+4-th subframe.

11. A User Equipment (UE) for transmitting or receiving data related to a Hybrid Automatic Repeat reQuest (HARQ) procedure to or from a plurality of Base Stations (BSs) in a wireless communication system, the UE comprising:
a Radio Frequency (RF) unit; and
a processor configured to control the RF unit,
wherein the processor is configured to:
receive, from a serving BS, information about HARQ processes allocated for the plurality of BSs and information about a BS pattern indicating a specific BS, among the plurality of BSs, performing communication with the UE in specific subframes, wherein at least one HARQ process allocated for one of the plurality of BSs is different from at least one HARQ process allocated for another of the plurality of BSs, and transmit or receive data to or from the specific BS in one of the specific subframes by using one of at least one HARQ process allocated for the specific BS.

12. A Base Station (BS) for transmitting or receiving data related to a Hybrid Automatic Repeat reQuest (HARQ) procedure to or from a User Equipment (UE) in a wireless communication system, the BS comprising:
 a Radio Frequency (RF) unit; and
 a processor configured to control the RF unit,
 wherein the process is configured to:
  transmit, to the UE, information about HARQ processes allocated for a plurality of BSs including the BS and information about a BS pattern indicating the BS performing communication with the UE in specific subframes, wherein at least one HARQ process allocated for one of the plurality of BSs is different from at least one HARQ process allocated for another of the plurality of BSs, and
  transmit or receive data to or from the UE in one of the specific subframes by using one of at least one HARQ process allocated for the BS.

13. The method according to claim 1, wherein the plurality of BSs includes a first BS and a second BS, and
 the BS pattern indicates the first BS performing communication with the UE in first subframes and indicates the second BS performing communication with the UE in second subframes, and
 wherein the first subframes and the second subframes are not overlapping each other.

14. The method according to claim 13, further comprising:
 transmitting or receiving data to or from the first BS in the first subframes by using a first HARQ process allocated to the first BS; and
 transmitting or receiving data to or from the second BS in the second subframes by using a second HARQ process allocated to the second BS,
 wherein the first HARQ process and the second HARQ process are different each other.

* * * * *